US008873458B2

(12) United States Patent
Lee et al.

(10) Patent No.: US 8,873,458 B2
(45) Date of Patent: Oct. 28, 2014

(54) RECEIVER FOR INTERLEAVE DIVISION MULTIPLEXING COOPERATIVE DIVERSITY AND POWER ALLOCATION ALGORITHM THEREOF

(75) Inventors: Jae Hong Lee, Seoul (KR); Chulhee Jang, Seoul (KR); Junho Jo, Anyang (KR)

(73) Assignees: LG Electronics Inc., Seoul (KR); SNU R & DB Foundation, Seoul (KR)

( * ) Notice: Subject to any disclaimer, the term of this patent is extended or adjusted under 35 U.S.C. 154(b) by 323 days.

(21) Appl. No.: 13/392,834

(22) PCT Filed: Aug. 27, 2010

(86) PCT No.: PCT/KR2010/005799
§ 371 (c)(1),
(2), (4) Date: Mar. 6, 2012

(87) PCT Pub. No.: WO2011/025308
PCT Pub. Date: Mar. 3, 2011

(65) Prior Publication Data
US 2012/0155372 A1    Jun. 21, 2012

(30) Foreign Application Priority Data
Aug. 28, 2009 (KR) .................. 10-2009-0080626

(51) Int. Cl.
*H04W 52/42* (2009.01)
(52) U.S. Cl.
CPC ...................................... *H04W 52/42* (2013.01)
USPC ........................................................ 370/318
(58) Field of Classification Search
CPC .............. H04B 7/15592; H04B 7/026; H04L 2001/0097; H04W 52/42; H04W 52/46
See application file for complete search history.

(56) References Cited

U.S. PATENT DOCUMENTS

2006/0115015 A1* 6/2006 Oh et al. ................. 375/267
2007/0135151 A1   6/2007 Dendy
(Continued)

FOREIGN PATENT DOCUMENTS

KR   10-2009-0055802 A   6/2009

OTHER PUBLICATIONS

Novak et al. MIMO-IDMA: Uplink multiuser mimo communications using interleave-division multiple access and low complexity iterative receivers IEEE ICA SSP Apr. 2007.*

(Continued)

*Primary Examiner* — Chirag Shah
*Assistant Examiner* — Rina Pancholi
(74) *Attorney, Agent, or Firm* — Birch, Stewart, Kolasch & Birch, LLP

(57) ABSTRACT

Disclosed is a receiver in a cooperative diversity system including one or a plurality of relays. The receiver includes: a detection unit configured to detect each of signals transmitted from the one or more relays, the one or more signals being generated by the one or more relays and by interleaving a signal from a transmitter; a deinterleaver configured to deinterleave each of the detected signals; a decoder configured to decode and each of the deinterleaved signals thereby to output one or more decoded signals; and an interleaver configured to interleave each of the one or more decoded signals thereby to output one or more interleaved signals, wherein the detection unit receives the one or more interleaved signals and compares them with the respective detected signals to discriminate the original signal transmitted by the transmitter.

8 Claims, 4 Drawing Sheets

(56) References Cited

U.S. PATENT DOCUMENTS

2008/0166975 A1* 7/2008 Kim et al. .................. 455/68
2009/0011702 A1* 1/2009 Horiuchi et al. ............ 455/9
2009/0116423 A1* 5/2009 Ni et al. ..................... 370/315
2010/0303032 A1 12/2010 Seo et al.

OTHER PUBLICATIONS

Title: Interleave Division Multiple Access Author: Ping et al. Publisher: IEEE transactions on wireless communications, vol. 5, No. 4, pp. 938-947 Apr. 2006.*

* cited by examiner

If SNR of transmitter-relay is 5dB

If SNR of transmitter-relay is 15dB

RECEIVER FOR INTERLEAVE DIVISION MULTIPLEXING COOPERATIVE DIVERSITY AND POWER ALLOCATION ALGORITHM THEREOF

TECHNICAL FIELD

The present invention relates to a cooperative diversity scheme.

BACKGROUND ART

Research for spatial diversity using a multiple input multiple output (MIMO) system has been actively ongoing in order to overcome performance degradation due to channel fading of radio communication.

The MIMO system, including a transmitter and a receiver each having two or more antennas, provides advantages such as a high data transfer rate, a low error rate, and an increased channel capacity, and the like.

However, in spite of the advantages of the MIMO system, in general, it is not possible to implement the MIMO system in uplink due to restrictions such as the size, weight, hardware complexity, and the like.

As an alternative, a cooperative diversity scheme has been proposed. The purpose of the cooperative diversity scheme is to obtain the advantages of a space diversity gain, a reduction in an error rate, an increase in a channel capacity, and the like, of the space diversity of the MIMO system. To this end, in the cooperative diversity scheme, a transmitter and adjacent relay terminals share resources such as frequency band and the like to form a virtual MIMO system to allow terminals having a single antenna to obtain the advantages of the MIMO system.

In the cooperative diversity scheme, orthogonal channels or orthogonal codes are used between relay terminals in order to eliminate interference between the relay terminals.

First, in the scheme using an orthogonal channel, the entire given channels are divided by time and frequency axes, and the respective relay terminals are allocated to the respective channels. This scheme is advantageous in that reception signals of the respective channel can be decoded by directly combining them but has shortcomings in that the increase in the use of channels by the number of relay terminals leads to a reduction in spectral efficiency. In addition, when the configuration of participating relay terminals, such as the number of relay terminals, changes due to a movement, the channels used by the relay terminals are also inevitably changed, so the relay terminals must be ordered (or aligned) at every transmission, and the like, increasing overhead of signal transmissions.

Next, in the scheme using an orthogonal code, although the relay terminals simultaneously transmit signals, their orthogonality is guaranteed, so there is no unnecessary reduction in the spectral efficiency. However, in order to use determined channel codes, relay terminals must need to accurately restore signals and re-encode them, which results in an increase in complexity of the relay terminals. In addition, when a channel between a transmitter and a relay terminal (a source-relay channel) is unstable, the scheme using an orthogonal code cannot be applicable. In addition, in order to use determined channel codes, a determined number of relay terminals must participate, which can be hardly achieved in actuality due to a frequency movement of the terminals. In addition, when there is a change in the configuration of the relay terminals due to a movement of the terminals, overhead of signal transmissions such as a transmission of information regarding ordering of the relay terminals and information regarding a code design, and the like, increases. Also, when the number of relay terminals that can participate is less than the number of relay terminals required for the determined codes, the scheme using an orthogonal code cannot be applicable. Thus, a network entry/exit of the relay terminals is restricted.

Meanwhile, the cooperative diversity scheme includes a single relay terminal-based cooperative diversity scheme using a single relay terminal and a multi-relay terminal-based cooperative diversity scheme using a plurality of relay terminals.

First, in the single relay terminal-based cooperative diversity scheme, the entire available time slots are divided into two orthogonal time slots for transmission of the transmitter and the relay terminal. In this case, on the first time slot, the transmitter broadcasts a message signal to other terminals serving as relays and a receiver 300. On the second time slot, the relay terminal retransmits the message signal, which has been received from the transmitter, to the receiver 300 according to a relay scheme. In this case, as the relay scheme, amplify and forward (AF) and decode and forward (DF) schemes are largely used. In case of the AF scheme, the relay terminal amplifies the message signal, which has been received from the transmitter, to have a certain size, and retransmits the amplified message signal. The AF scheme is advantageous in that it can implement simpler hardware because there is no signal processing procedure resulting from a decoding operation, but has drawbacks that because noise added in the relay terminal is delivered to the receiver 300, performance is degraded in a low signal-to-noise ration (SNR) environment. Meanwhile, in case of the DF scheme, the relay terminal decodes a signal received from the transmitter, re-encodes it to generate a message signal, and transmits the generated message signal to the receiver 300. However, in the DF scheme, the relay terminal decodes the message signal from the transmitter, re-encodes it, and then transmits the same, which is, thus, less affected by noise, but hardware complexity increases due to the decoding of the message signal of the transmitter.

Meanwhile, the multi-relay terminal-based cooperative diversity scheme has a time slot structure in the form of a repetition code. The entire available time slots are divided by the number of transmitters and relay terminals. On the first time slot, the transmitter broadcasts a message signal to other terminals serving as relays and the receiver 300. Thereafter, each relay terminal sequentially retransmits the message signal from the transmitter according to a determined relay scheme on each allocated time slot. Research reveals that the multi-relay terminal-based cooperative diversity scheme achieves good performance as the number of relay terminals increases, but the length of a time slot allocated for the message signal is reduced to cause a problem in that a bandwidth efficiency is reduced.

A space-time coding relay scheme is another type of the multi-relay terminal-based cooperative diversity scheme. In the space-time coding relay scheme, the entire available time slots are divided into two orthogonal time slots for transmissions of the transmitter and the relay terminal. On a first time slot, the transmitter broadcasts a message signal to other terminals serving as relays and the receiver 300. On a second time slot, relay terminals restore the signal which has been received from the transmitter, space-time-codes the restored signals to have orthogonality between the respective relays, and re-transmits the coded signals to the receiver 300. The space-time coding relay scheme is effective for a bandwidth utilization and disadvantageous in that hardware complexity increases according to the space-time coding to obtain orthogonality and the space-time coding relay scheme can be applicable only to a particular number of relays.

Research regarding the existing cooperative diversity scheme has been largely conducted on protocols, coding schemes, relay terminal selection schemes, and the like, in case of a single relay terminal, or when the number of relay terminals is uniform or complexity is high and a frequency efficiency is not good in case of multiple relay terminals.

However, in an actual wireless communication network environment, terminals tend to frequently move, and because relay terminals can freely participate in a network or exit from the network, the mentioned related art cooperative diversity scheme can be hardly applicable.

DISCLOSURE OF INVENTION

Solution to Problem

Therefore, an object of the present invention is to provide a cooperative diversity scheme allowing a terminal to freely participate in a network, reducing complexity although a certain number of relay terminals exist, and maintaining a frequency efficiency.

Another object of the present invention is to provide a power allocation algorithm capable of improving performance.

To achieve the above objects, an interleave division multiple access (IDMA) is proposed. The IDMA is a special form of a code division multiple access (CDMA) system, which does not use a spreading code, which is used only for discriminating users, and spares every bandwidth extension for coding. In the IDMA, users are discriminated by using a unique interleave pattern allocated to each user. Accordingly, a frequency efficiency can be improved, and because the user-specific interleavers do have little correlation among users or adjacent signals, a multi-user detection having a lower complexity than that of the multi-user detection of the CDMA system can be made.

In addition, to achieve the above objects, a power allocation algorithm aiming at reducing a bit error rate is proposed.

To achieve these and other advantages and in accordance with the purpose of the present invention, as embodied and broadly described herein, there is provided a receiver in a cooperative diversity system including one or a plurality of relays. The receiver may include: a detection unit configured to detect each of signals transmitted from the one or more relays, the one or more signals being generated by the one or more relays and by interleaving a signal from a transmitter; a deinterleaver configured to deinterleave each of the detected signals; a decoder configured to decode and each of the deinterleaved signals thereby to output one or more decoded signals; and an interleaver configured to interleave each of the one or more decoded signals thereby to output one or more interleaved signals, wherein the detection unit receives the one or more interleaved signals and compares them with the respective detected signals to discriminate the original signal transmitted by the transmitter.

The respective detected signals may be generated by encoding a signal from the transmitter using one or more channel code of the one or more relays.

The decoder may use one or more channel codes of the one or more relays.

The deinterleaver may deinterleave each of the discriminated signals thereby to output deinterleaved signals, and the decoder decodes each of the deinterleaved signals.

The detection unit may estimate one or more channels with the one or more relays, determines a power level with respect to each of the one more relays by using the estimated channels, and feeds back information regarding each of the determined power levels to the one or more relays.

To achieve these and other advantages and in accordance with the purpose of the present invention, as embodied and broadly described herein, there is also provided a reception method in a receiver in a cooperative diversity system including one or more relays.

The reception method may include: detecting one or more signals transmitted from the one or more relays, wherein the one or more signals are generated by the one or more relays and by interleaving a signal from a transmitter; deinterleaving and then decoding each of the detected signals; interleaving each of the decoded signals; and comparing the interleaved signals with each of the detected signals to discriminate the original signal which has been transmitted by the transmitter.

The one or more detected signals may be encoded using a channel code of the one or more relays.

The one or more detected signals are generated by the one or more relays based on the signal from the transmitter.

In the decoding operation, one or more channel codes of the one or more relays may be used.

In the discriminating operation, a distortion component according to a channel with the one or more relays may be canceled.

The method may further include: deinterleaving each of the discriminated signals; mixing the deinterleaved signals; and decoding each of the mixed signals.

In the decoding operation, a channel code of the one or the more relays may be used.

The method may further include: estimating a channel with the one or more relays; determining a power level of each of the one or more relays by using the estimated channel; and feeding back information regarding each of the determined power levels to the one or more relays.

The respective detected signals may be signals which have been transmitted by the one or more relays according to the determined power levels.

The present invention proposes an interleave division multiplexing network applicable to a network in which movable relay terminals exist just like an actual situation.

According to exemplary embodiments of the present invention, although the number or configuration of relay terminals changes, there is not task to be performed by the relay terminals, overhead is considerably low compared with the related art. In addition, terminals may freely operate as relay terminals or not. Also, because the relay terminals perform only detection and interleaving, complexity is significantly low compared with the related art in which decoding and re-encoding are performed. In addition, because all the relay terminals transmit signals by using the same channel, it is very effective in terms of spectral efficiency.

Moreover, a bit error rate can be reduced by increasing a signal-to-interference-plus-noise ratio (SINR) by controlling power of the relay terminals.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
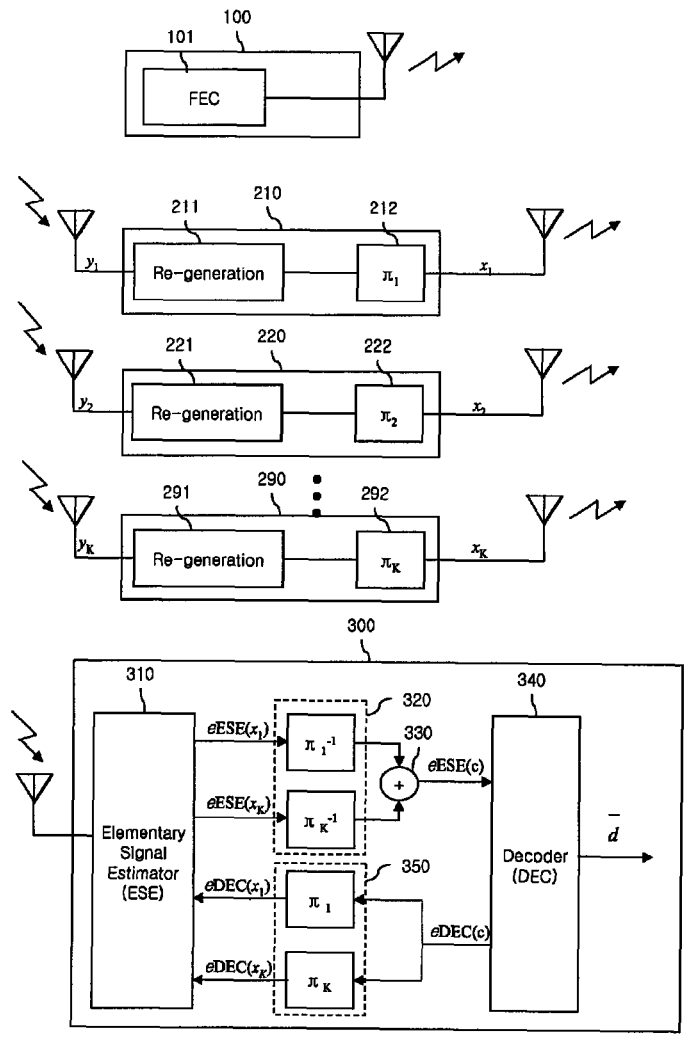
FIG. 1 illustrates the structure of a system for interleave division multiplexing cooperative diversity according to an exemplary embodiment of the present invention.

The present invention is applied to cooperative diversity. However, the present invention is not limited thereto and can be applicable to any communication system and method or other copyright-related system and methods to which the technical idea of the present invention can be applied.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention. The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

FIG. 1 illustrates the structure of a system for interleave division multiplexing cooperative diversity according to an exemplary embodiment of the present invention.

The system includes a transmitter (or a source) 100, a plurality of relays or relay terminals 210, 220, ..., 290 (will be generally referred to as '200', hereinafter), and a receiver 300 (or a destination) 300.

The transmitter 100, the relay terminal 200, and the receiver 300 include a single antenna, respectively. For the sake of explanation, it is illustrated that the relay terminal includes two antennas, namely, a transmission antenna and a reception antenna, but the relay terminal may include a single antenna for transmission and reception.

The transmitter 100 may be a mobile terminal and the receiver 300 may be a base station of a cellular system, or conversely, the transmitter 100 may be a base station and the receiver may be a mobile terminal.

In FIG. 1, it is illustrated that one transmitter 100 and one receiver 300 exist and a plurality of (i.e., k number of) relay terminals 200 exist.

The transmitter 100 includes a forward error correction (FEC) 101. The transmitter 100 transmits the message signal on the first time slot to the plurality of relay terminals 200. In detail, the transmitter 100 encodes the message signal by using a channel code and broadcasts the same to each of the relay terminals.

The plurality of relay terminals 200 include regenerators 211, 221, and 291 and interleavers 212, 222, and 292, respectively.

The plurality of relay terminals regenerate the message signal from the transmitter 100 through the regenerators 211, 221, and 291, and rearranges the regenerated message signals through the interleavers 212, 222, and 292.

In this case, the plurality of relay terminals perform regeneration through a soft decision by bits, rather than performing decoding by frames on the received message signal, respectively. Thus, the complexity of the plurality of relay terminals can be reduced compared with the existing cooperative diversity scheme. Also, the respective interleavers 212, 222, and 292 of the plurality of relay terminals 200 are designed to have no correlation therebetween, and this is the unique characteristics of the relay terminals.

The plurality of relay terminals 200 simultaneously retransmit the rearranged message signal on the second time slot to the receiver 300, respectively.

In this case, the signals retransmitted from the plurality of relay terminals 200 can be represented by Equation 1 shown below:

$$x_k(j) = \pi_k(\hat{y}_k(j)) \quad \text{[Equation 1]}$$

Herein, $x_k(j)$ is a signal transmitted by a relay terminal k, $y_k(j)$ is a signal received by the relay terminal k, $\hat{y}_k(j)$ is a signal obtained by regenerating $y_k(j)$, and $\pi_k(\cdot)$ is a symbol indicating rearrangement of the order according to a unique interleaver of the relay terminal k.

Meanwhile, the receiver 300 includes an elementary signal estimator (ESE) 310, a deinterleaver 320, a mixer 330, a decoder 340, and an interleaver 350.

The receiver 300 decodes a signal by using a repeated scheme through the ESE 310 and the decoder 340.

The ESE 310 restores each signal received from the plurality of relay terminals 200. In this case, the signals from the plurality of relay terminals 200 include a distortion component.

The deinterleaver 320 deinterleaves an output from the ESE 310 and outputs the same, and the mixer 330 mixes the deinterleaved signals and outputs the same to the decoder 340.

The decoder 340 decodes the mixed signal by using a channel code used in the transmitter 100 and outputs the same. Thus, because the output from the ESE 310 is used in performing decoding, the reliability of the restoration can be improved. Also, the output from the decoder 340 is inputted to the ESE 310, so that the ESE 310 can effectively cancel the distortion component.

The interleaver 350 interleaves the decoded signal and outputs the same to the ESE 310.

Then, the ESE 310 estimates a channel between the receiver 300 and the relay terminal 200 by using the output from the decoder 340 and properly cancels the distortion component by using the estimated channel to restore the signal, which has been transmitted from the relay terminal 200, by bits.

This process can be repeatedly performed to effectively restore the reception signal.

The operation of the receiver 300 will now be described through an equation representation.

First, the output component of the ESE 310 of the receiver 300 can be explained as follows.

The ESE 310 of the receiver 300 serves to restore the signal which has been received from each relay terminal 200, and in this case, a channel code used in the transmitter 100 is not considered. At a particular relay terminal's side, a signal transmitted from a different relay terminal is an interference component, and the distortion component including the interference component and noise follows a Gaussian probability distribution by a central limit theorem. Thus, the probability distribution of the signals transmitted from the respective relay terminals 200 can be expressed by the Gaussian probability distribution, and accordingly, the output value from the ESE of the receiver 300 can be represented by Equation 2 shown below:

$$e_{ESE}(x_k(j)) = \log \frac{p(y_d(j) \mid x_x(j) = +1, h_{k,d})}{p(y_d(j) \mid x_x(j) = -1, h_{k,d})}$$ [Equation 2]

$$= 2\sqrt{p_k} |h_{k,d}|^2 \frac{\text{Re}(h_{k,d}^* y_d(j)) - E[\text{Re}(h_{k,d}^* \zeta_k(j))]}{V[\text{Re}(h_{k,d}^* \zeta_k(j))]}$$

In Equation 2,
$y_d(j)$ is a signal received by the receiver 300, $h_{k,d}$ is a channel coefficient between the relay terminal 200 k and the receiver 300, $p_k$ is power allocated to the relay terminal k, $\zeta_k(j)$ is a distortion component in view point of the signal transmitted from the relay terminal k, Re(•) is a symbol indicating a real number part, E[•] is a symbol indicating an average, and V[•] is a symbol indicating a variance.

The average and variance required for calculating Equation 2 can be represented by Equation 3a, Equation 3b, Equation 3c, Equation 3d, Equation 3e, Equation 3f, Equation 3g, Equation 3h, and Equation 3i shown below:

$$E[x_k(j)] = \tanh\left(\frac{e_{DEC}(x_k(j))}{2}\right)$$ [Equation 3a]

$$V[x_k(j)] = 1 - E[x_k(j)]^2$$ [Equation 3b]

$$E[\text{Re}(y_d(j))] = \sum_{k=1}^{K} \sqrt{p_k} \, \text{Re}(h_{k,d}) E[x_k(j)]$$ [Equation 3c]

$$E[\text{Im}(y_d(j))] = \sum_{k=1}^{K} \sqrt{p_k} \, \text{Im}(h_{k,d}) E[x_k(j)]$$ [Equation 3d]

$$V[\text{Re}(y_d(j))] = \sum_{k=1}^{K} p_k |\text{Re}(h_{k,d})|^2 V[x_k(j)] + \sigma^2$$ [Equation 3e]

$$V[\text{Im}(y_d(j))] = \sum_{k=1}^{K} p_k |\text{Im}(h_{k,d})|^2 V[x_k(j)] + \sigma^2$$ [Equation 3f]

$$E[\text{Re}(h_{k,d}^* \zeta_k(j))] = \text{Re}(h_{k,d}) E[\text{Re}(y_d(j))] +$$ [Equation 3g]
$$\text{Im}(h_{k,d}) E[\text{Im}(y_d(j))] - \sqrt{p_k} |h_{k,d}|^2 E[x_k(j)]$$

$$\psi(j) = \sum_{k=1}^{K} \sqrt{p_k} \, \text{Re}(h_{k,d}) \text{Im}(h_{k,d}) V[x_k(j)]$$ [Equation 3h]

$$V[\text{Re}(h_{k,d}^* \zeta_k(j))] = |\text{Re}(h_{k,d})|^2 V[\text{Re}(y_d(j))] +$$ [Equation 3i]
$$|\text{Im}(h_{k,d})|^2 V[\text{Im}(y_d(j))] + 2\text{Re}(h_{k,d}) \text{Im}(h_{k,d}) \psi(j) - p_k |h_{k,d}|^4 V[x_k(j)]$$

In the above equations, Im(•) indicates an imagery number part, and $\sigma^2$ indicates a variance per dimension of noise of a channel between the relay terminal and the receiver 300.

In Equation 2 and Equation 3, although the number K of the relay terminals changes, there is no change in the calculation method, and thus, terminals can freely operate as relay terminals. Information regarding the signal transmitted from the transmitter 100 can be obtained by using the output value from the ESE 310 with respect to the signals transmitted by the respective relay terminals 200 as represented by Equation 4 shown below:

$$e_{ESE}(c(j)) = \sum_{k=1}^{K} \pi_k^{-1}(e_{ESE}(x_k(j)))$$ [Equation 4]

In Equation 4, c(j) indicates the signal transmitted from the transmitter 100, and $\pi_k^{-1}$ indicates a process of deinterleaving a signal from an interleaver of the relay terminal K.

The decoder 340 restores the signal by utilizing the results of Equation 4. The decoder 340 decodes the channel code used in the transmitter 100. In this case, a general APP coding may be used.

A signal to interference plus noise ratio (SINR) of the message signal from the transmitter 100, which has been received by the receiver 300 during two time slots, can be represented by Equation 5 shown below:

$$\gamma_i = \sum_{k=1}^{K} \frac{p_k |h_{k,d}|^2 \{1 - 2g(h_{s,k}, p_0)\}}{\sum_{l \neq k} p_l |h_{l,d}|^2 \{f(\gamma_{i-1}) + 2g(h_{s,l}, p_0) - 2f(\gamma_{i-1})g(h_{s,l}, p_0) + \sigma^2\}}$$ [Equation 5]

In Equation 5, $p_0$ is power allocated to the transmitter, $h_{s,k}$ is a channel coefficient between the transmitter and the relay terminal K, $g(h_{s,k},p_0)$ is the probability that the relay terminal k will regenerate an erroneous signal when $h_{s,k}$ and $p_0$ are given, and $f(\gamma)$ is a barometer indicating the degree of a restoration accuracy of a transmission signal in the decoder of the receiver 300 when $\gamma$ is given.

Meanwhile, a problem formulation of a power allocation algorithm with respect to the interleave division multiplexing cooperative diversity scheme can be represented by Equation 6 shown below. Also, Restriction condition of the problem formulation can be represented by Equation 7a and Equation 7b shown below:

$$\{p_k\} = \underset{\{p_k\}}{\operatorname{argmax}} \gamma_I$$ [Equation 6]

$$\sum_{k=1}^{K} p_k \leq P_{t,r}$$ [Equation 7a]

$$p_k \leq P_{k,max}, \forall k$$ [Equation 7b]

I indicates the number of times of decoding in the receiver 300, $p_{t,r}$ indicates total power that can be used by the relay terminal, and $p_{k,max}$ indicates maximum transmission power that can be used by the relay terminal k.

The optimization problem formulated by Equation 6, which is nonlinear, is not a convex optimization problem, and uses a repetition scheme. Thus, solving the optimization problem formulated by Equation 6 requires a considerable complexity and is unfit to be actually applied to a system.

Thus, in order to propose an algorithm that can simplify the problem and be easily applicable to an actual system, a decay factor δ is introduced and a new variable as shown in Equation 8a below is introduced on the assumption that an interference component can be canceled upon the repetition of I number of times. In addition, it is assumed that the receiver 300 sends m-bit feedback information regarding a power allocation. Thus, the amount of power allocated to the relay terminal 300 may be represented by a $L=2^m$ step, which is represented by equation 8b shown below. Also, the number of relay terminals corresponding to each power amount is defined as $\phi(I)$ and a maximum value of the number $\phi(I)$ of the relay terminals is defined as $\phi_{max}(I)$ in consideration of the channel coefficient and the maximum power amount of each relay terminal.

$$q_k @ p_k |h_{k,d}|^2 \{1 - 2g(h_{s,k}, p_0)\}$$ [Equation 8a]

$$Q_{set} = \{q(1), q(2), L, q(L) = \max_m q_m\}.$$ [Equation 8b]

Thus, the optimization problem can be represented by Equation 9 shown below, and restriction conditions of the optimization problem can be represented by Equation 10a, Equation 10b, Equation 10c, and Equation 10d shown below:

$$\{q_k\} = \underset{\{q_k\}}{\operatorname{argmax}} \gamma$$ [Equation 9]

$$\gamma = \sum_{k=1}^{K} \frac{q_k}{\sum_{l \neq k} q_l \left( \frac{1}{1 - 2g(E[h_{s,l}], p_0)} - 1 \right) + \sigma^2}$$ [Equation 10a]

$$\sum_{l=1}^{L} \phi(l) = K$$ [Equation 10b]

$$\phi(l) \leq \sigma_{max}(l).$$ [Equation 10c]

$$\sum_{l} \phi(l)q(l)f(\gamma_1) \leq \delta \sum_{l} \phi(l)q(l)f(\gamma_0)$$ [Equation 10d]

The optimization problem formulated by Equation 9 is a problem that power has a discrete value, and a solution thereof can be found with not much high complexity through exhaustive search.

The distribution of $\{p_k\}$ can be obtained through the following process through the distribution of $\{q_k\}$ obtained through the problem.

First, a set of available relay terminals k and a set of available power levels $Q=\{\tilde{q}_1, \ldots, \tilde{q}_K\}$ are initialized.

In detail, every k is initialized with $q_k=0$. And, a variable $\lambda_k=|h_{k,d}|^2\{1-2g(h_{s,k},p_0)\}$ is also initialized.

A relay terminal 200 which has the highest power level is selected. In this case, among the set of available relay terminals, a relay terminal having the largest $\lambda_k$ indicating a channel state with the transmitter is considered to be selected at first. And then if available power $p_k$ is supported by the selected relay terminal, the terminal is finally selected. When the relay terminal is selected, the selected relay terminal and power level are excluded from the set of the available relay terminals and the set of available power levels. This process is performed on every available power levels.

--- for i = 1 : K do $\quad$ k′ = arg $\underset{k}{\max} \lambda_k$ $\quad$ j = n(Q)
$\quad$ while $q_{k'}$ = 0 do
$\quad\quad$ if $q_j \leq \lambda_j P_k$, then $$p_{k'} = \frac{q_j}{\lambda_k}$$

$\quad\quad$ else j = j − 1
$\quad$ end while
$\quad$ K = K − {k'}, Q = Q − {$q_j$}
end for

---

The method according to exemplary embodiments of the present invention described thus far can be implemented as software, hardware or their combination. For example, the method according to exemplary embodiments of the present invention may be stored in a storage medium (e.g., an internal memory of a mobile terminal, a flash memory, a hard disk, and the like), and may be implemented as codes or commands in a software program that can be executed by a processor.

Figure 2:
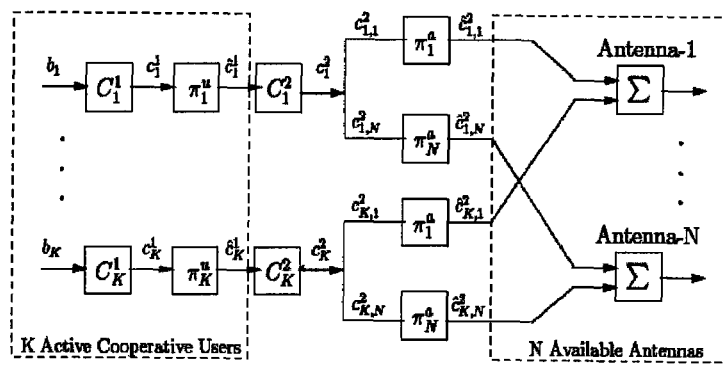
FIG. 2 is a modification of the system according to an exemplary embodiment of the present invention.

FIG. 2 is a modification of the system according to an exemplary embodiment of the present invention.

As shown in FIG. 2, another system using an interleaver by modifying the concept of the present invention is proposed.

In the modification illustrated in FIG. 2, a plurality of transmitters transmit the same data in cooperation with each other. Also, a somewhat complicated code is used. In this system, in order to use different codes according to K (namely, in order not to use a channel code when K=1), the transmitter, the relay terminal, and the receiver all must know about the value K. Thus, in order for the transmitters, a relay terminal, and a receiver to know about the value K, signal transmissions must be additionally performed for the value K, causing overhead.

Meanwhile, the modification illustrated in FIG. 2 is based on the assumption that relay terminals perfectly receive signals transmitted by the transmitters. However, such an assumption is unrealistic in an actual mobile communication network in which relay terminals move. In order to assume that even a fixed relay perfectly receives a signal, a complicated channel code must be used in a source, and the relay requires a decoder for decoding the channel code, so there is a difference in complexity in the relay compared with the scheme proposed by the present invention.

Meanwhile, in the system illustrated in FIG. 1, the diversity effect is obtained as the plurality of relay terminals rearrange the frames (or subframes or slots) received from the transmitter such that the positions of the frames are different by using the respective interleavers, while in the modification illustrated in FIG. 2, each $C_1^2$ is divided into streams of $c_{1,1}^2$-$c_{1,N}^2$ and transmitted through different antennas. Thus, it is meaningless in case of K=1. Namely, the interleaver in the modification is fundamentally used to discriminate signals from the transmitters with respect to K, not 1, so it is different from that of FIG. 1.

FIGS. 3 to 6 show the performance of the system illustrated in FIG. 1 obtained through a computer simulation. A Rayleigh fading channel was assumed in the simulation environment, and the results of the simulation through formation of independent channels of 107 times are shown.

In FIGS. 3 to 6, $N_o$ is a variance of noise, which has the same value as $2\sigma^2$, BER indicates a bit error rate, and k indicates the number of relay terminals.

Figure 3:
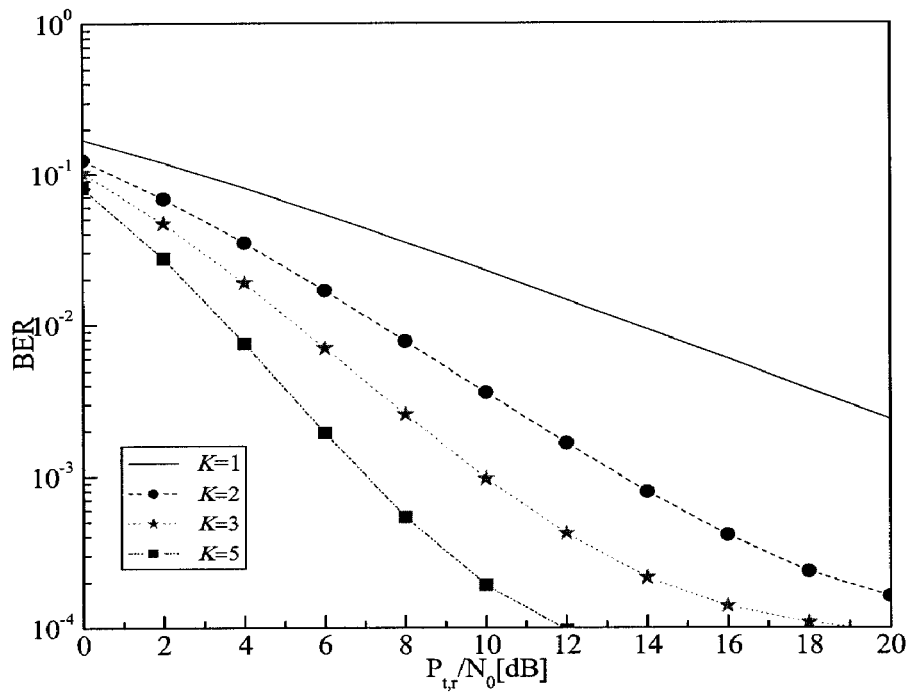
FIGS. 3 to 6 show the performance of the system illustrated in FIG. 1 obtained through a computer simulation.
Figure 4:
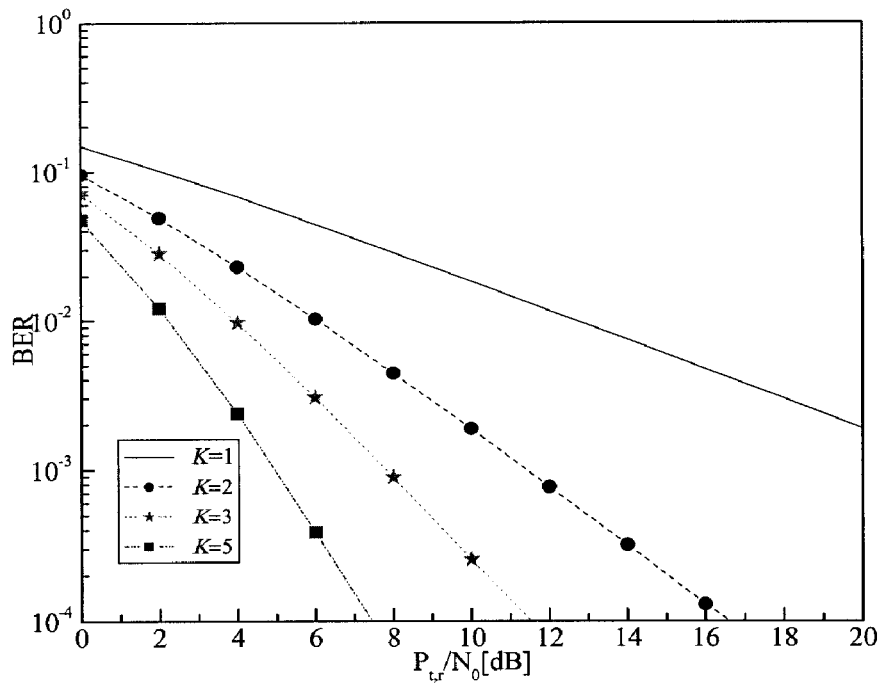

As shown in FIGS. 3 and 4, the interleave division multiplexing cooperative diversity system illustrated in FIG. 1 exhibits a diversity gain increased according to an increase in the number of relay terminals and a drastically reduced BER.

In detail, as shown in FIG. 3, when the repetition number of the foregoing process in the receiver 300 is 3, $p_0/N_0$=5 dB, and the respective relay terminals use the same power, it is noted that the BER according to the number of relay terminals can be significantly reduced.

Also, as shown in FIG. 4, when the repetition number of the foregoing process in the receiver 300 is 3, $p_0/N_0$=15 dB, and the respective relay terminals use the same power, it is noted that the BER according to the number of relay terminals can be significantly reduced.

Figure 5:
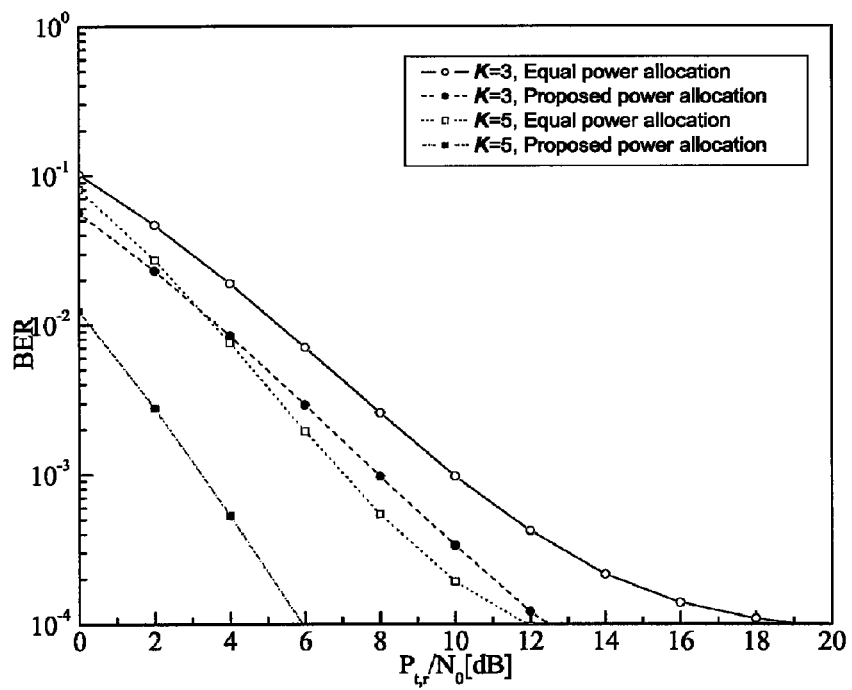
Figure 6:
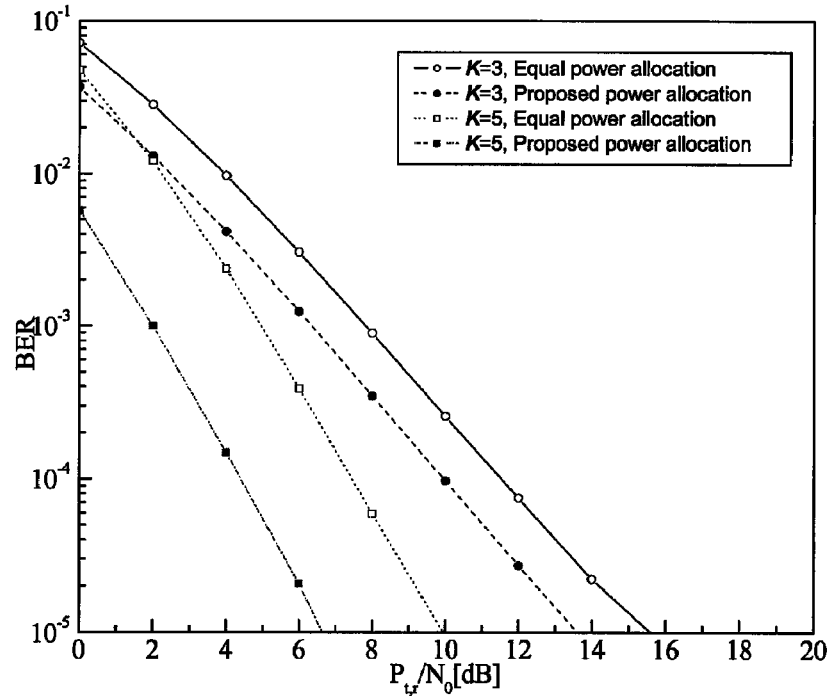

Also, as shown in FIGS. 5 and 6, it is noted that the BER can be drastically reduced when different power is allocated to each relay terminal compared with the case in which the same power is allocated to each relay terminal.

Figure 7:
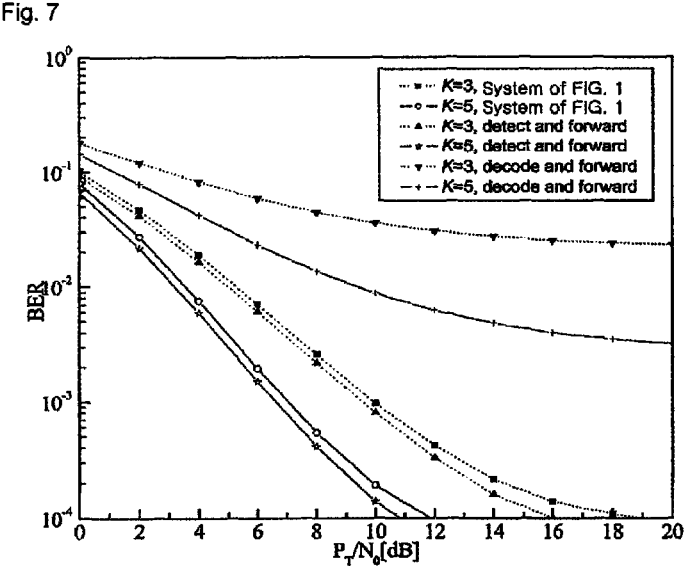
FIGS. 7 and 8 show comparison of the system illustrated in FIG. 1 and the system illustrated in FIG. 2.
Figure 8:
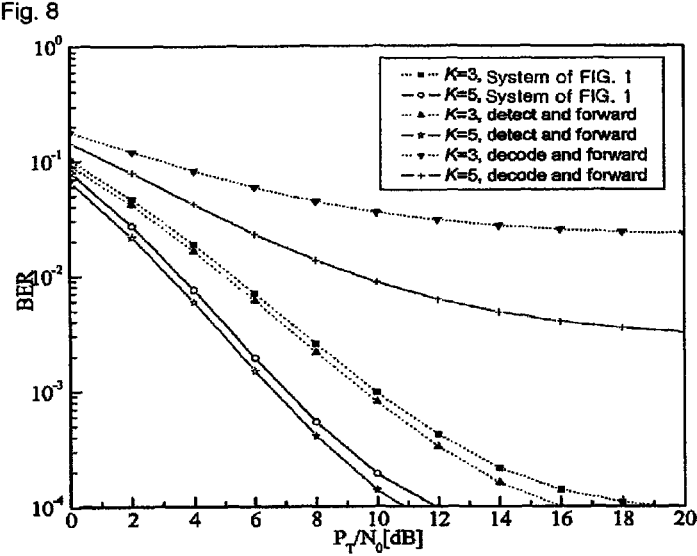

In detail, as shown in FIG. 5, when the repetition number of the foregoing process in the receiver 300 is 3 and $p_0/N_0$=5 dB and m=3, the BER is considerably reduced according to the number of relay terminals and as different power is allocated to each relay terminal As shown in FIG. 6, when the repetition number of the foregoing process in the receiver 300 is 3 and $p_0/N_0$=15 dB and m=3, the BER is considerably reduced according to the number of relay terminals and as different power is allocated to each relay terminal FIGS. 7 and 8 show comparison of the system according to the present invention illustrated in FIG. 1 and the related art system.

A detect and forward scheme and decode and forward scheme as the related art are compared with the system according to an exemplary embodiment of the present invention. In this case, it is assumed that the related art uses an orthogonal channel and there is no channel between a transmitter and a receiver.

FIG. 7 shows a case in which an SNR of a channel between the transmitter and a relay terminal is 5 dB, and FIG. 8 shows a case in which an SNR of a channel between the transmitter and the relay terminal is 15 dB.

As shown in FIGS. 7 and 8, when the system according to an exemplary embodiment of the present invention is compared with the related art decode and forward scheme, it is noted that the performance of the system illustrated in FIG. 1 is superior when there is no channel between the transmitter and receiver because it frequently happens that terminals cannot operated as relay terminals, in the related art decode and forward scheme.

When the system according to an exemplary embodiment of the present invention is compared with the related art detect and forward scheme, a spectral efficiency of the related art detect and forward scheme is lower than that of the system according to an exemplary embodiment of the present invention in consideration of the fact that the related art detect and forward scheme cannot use an orthogonal code.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A reception method performed by a receiver in a cooperative diversity system including one or more relays, the method comprising:
   estimating one or more channels between the receiver and the one or more relays;
   determining power levels for the one or more relays based on the one or more estimated channels;
   allocating the determined power levels to the one or more relays;
   receiving at least one signal transmitted from the one or more relays according to the determined power levels;
   detecting one or more signals from the received at least one signal;
   deinterleaving each of the detected signals to generate a deinterleaved signal; and
   decoding the deinterleaved signal,
   wherein each of the detected signals is obtained by the following equation:

$$e_{ESE}(x_k(j)) = 2\sqrt{p_k}\,|h_{k,d}|^2 \frac{\text{Re}(h_{k,d}^* y_d(j)) - E[\text{Re}(h_{k,d}^* \zeta_k(j))]}{V[\text{Re}(h_{k,d}^* \zeta_k(j))]}$$

where $x_k(j)$ indicates a signal transmitted from a k-th relay of the one or more relays, $e_{ESE}(x_k(j))$ indicates a k-th detected signal, $y_d(j)$ indicates the at least one signal received by the receiver, $h_{k\_d}$ indicates a channel coefficient of an estimated channel between the k-th relay and the receiver, $p_k$ indicates a power level allocated to the k-th relay, $\zeta_k(j)$ indicates a distortion to the signal transmitted from the k-th relay, Re( ) indicates a real part, E[ ] indicates an average, V[ ] indicates a variance, * indicates a complex conjugate operation, || indicates an absolute value.

2. The method of claim 1, wherein the deinterleaved signal is obtained by:

$$e_{ESE}(c(j)) = \sum_{k=1}^{K} \pi_k^{-1}(e_{ESE}(x_k(j)))$$

where $e_{ESE}(c(j))$ is the deinterleaved signal, and $\pi_k^{-1}$ indicates a deinterleaving process corresponding to an interleaver of the k-th relay.

3. The method of claim 1, wherein $E[Re(h^*_{k,d}\zeta_k(j))]$ and $V[Re(h^*_{k,d}\zeta_k(j))]$ are obtained by:

$E[Re(h^*_{k,d}\zeta_k(j))]=Re(h_{k,d})E[Re(y_d(j))]+Im(h_{k,d})E[Im(y_d(j))]-\sqrt{p_k}|h_{k,d}|^2 E[x_k(j)]$, $V[Re(h^*_{k,d}\zeta_k(j))]=|Re(h_{k,d})|^2 V[Re(y_d(j))]+|Im(h_{k,d})|^2 V[Im(y_d(j))]+2Re(h_{k,d})Im(h_{k,d})\psi(j)-p_k|h_{k,d}|^4 V[x_k(j)]$, $$\psi(j) = \sum_{k=1}^{K} \sqrt{p_k} \, Re(h_{k,d})Im(h_{k,d})V[x_k(j)],$$

$$E[Re(y_d(j))] = \sum_{k=1}^{K} \sqrt{p_k} \, Re(h_{k,d})E[x_k(j)],$$

$$E[Im(y_d(j))] = \sum_{k=1}^{K} \sqrt{p_k} \, Im(h_{k,d})E[x_k(j)],$$

$$V[Re(y_d(j))] = \sum_{k=1}^{K} p_k |Re(h_{k,d})|^2 V[x_k(j)] + \sigma^2,$$

$$V[Im(y_d(j))] = \sum_{k=1}^{K} p_k |Im(h_{k,d})|^2 V[x_k(j)] + \sigma^2, \text{ and}$$

$$V[x_k(j)] = 1 - E[x_k(j)]^2$$

where $\sigma^2$ indicates a variance of noise of the one or more channels, and Im( ) indicates an imaginary part.

4. The method of claim 1, wherein one or more channel codes of the one or more relays are used for the decoding.

5. A receiver in a cooperative diversity system including one or more relays, the receiver comprising:
   a memory; and
   a processor coupled to the memory, the processor configured to:
   estimate one or more channels between the receiver and the one or more relays;
   determine power levels for the one or more relays based on the one or more estimated channels;
   allocate the determined power levels to the one or more relays;
   receive at least one signal transmitted from the one or more relays according to the determined power levels;
   detect each of signals from the received at least one signal;
   deinterleave each of the detected signals to generate a deinterleaved signal; and
   decode the deinterleaved signal,
   wherein each of the detected signals is obtained by the following equation:

$$e_{ESE}(x_k(j)) = 2\sqrt{p_k} \, |h_{k,d}|^2 \frac{Re(h^*_{k,d}y_d(j)) - E[Re(h^*_{k,d}\zeta_k(j))]}{V[Re(h^*_{k,d}\zeta_k(j))]}$$

where $x_k(j)$ indicates a signal transmitted from a k-th relay of the one or more relays, $e_{ESE}(x_k(j))$ indicates a k-th detected signal, $y_d(j)$ indicates the at least one signal received by the receiver, $h_{k,d}$ indicates a channel coefficient of an estimated channel between the k-th relay and the receiver, $p_k$ indicates a power level allocated to the k-th relay, $\zeta_k(j)$ indicates a distortion to the signal transmitted from the k-th relay, Re( ) indicates a real part, E[ ] indicates an average, V[ ] indicates a variance, * indicates a complex conjugate operation, || indicates an absolute value.

6. The receiver of claim 5, wherein the deinterleaved signal is obtained by:

$$e_{ESE}(c(j)) = \sum_{k=1}^{K} \pi_k^{-1}(e_{ESE}(x_k(j)))$$

where $e_{ESE}(c(j))$ is the deinterleaved signal, and $\pi_k^{-1}$ indicates a deinterleaving process corresponding to an interleaver of the k-th relay.

7. The receiver of claim 5, wherein one or more channel codes of the one or more relays are used for the decoding.

8. The receiver of claim 5, wherein $E[Re(h^*_{k,d}\zeta_k(j))]$ and $V[Re(h^*_{k,d}\zeta_k(j))]$ are obtained by:

$E[Re(h^*_{k,d}\zeta_k(j))]=Re(h_{k,d})E[Re(y_d(j))]+Im(h_{k,d})E[Im(y_d(j))]-\sqrt{p_k}|h_{k,d}|^2 E[x_k(j)]$, $V[Re(h^*_{k,d}\zeta_k(j))]=|Re(h_{k,d})|^2 V[Re(y_d(j))]+|Im(h_{k,d})|^2 V[Im(y_d(j))]+2Re(h_{k,d})Im(h_{k,d})\psi(j)-p_k|h_{k,d}|^4 V[x_k(j)]$, $$\psi(j) = \sum_{k=1}^{K} \sqrt{p_k} \, Re(h_{k,d})Im(h_{k,d})V[x_k(j)],$$

$$E[Re(y_d(j))] = \sum_{k=1}^{K} \sqrt{p_k} \, Re(h_{k,d})E[x_k(j)],$$

$$E[Im(y_d(j))] = \sum_{k=1}^{K} \sqrt{p_k} \, Im(h_{k,d})E[x_k(j)],$$

$$V[Re(y_d(j))] = \sum_{k=1}^{K} p_k |Re(h_{k,d})|^2 V[x_k(j)] + \sigma^2,$$

$$V[Im(y_d(j))] = \sum_{k=1}^{K} p_k |Im(h_{k,d})|^2 V[x_k(j)] + \sigma^2, \text{ and}$$

$$V[x_k(j)] = 1 - E[x_k(j)]^2$$

where $\sigma^2$ indicates a variance of noise of the one or more channels, and Im( ) indicates an imaginary part.

* * * * *